Aug. 2, 1927.
W. R. KOHLER
1,637,614
COASTER WAGON
Filed May 29, 1926  3 Sheets-Sheet 3
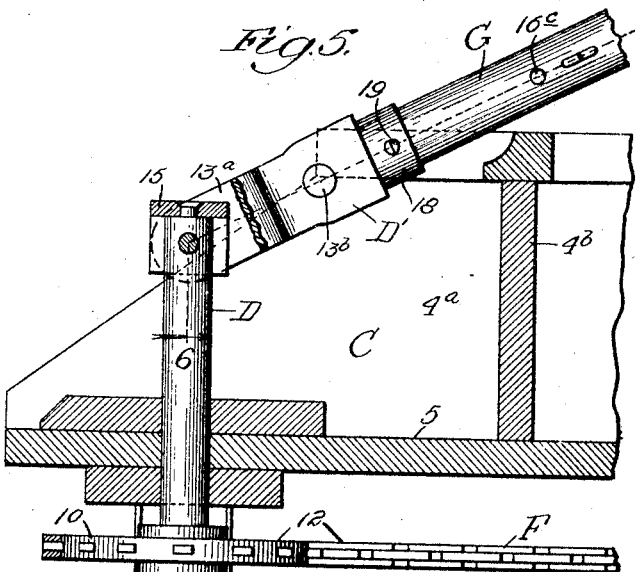
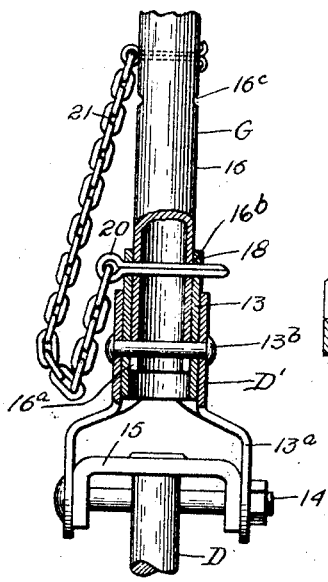
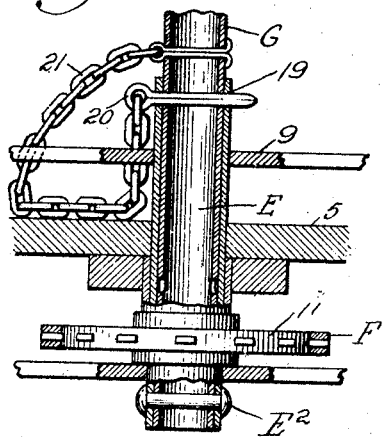
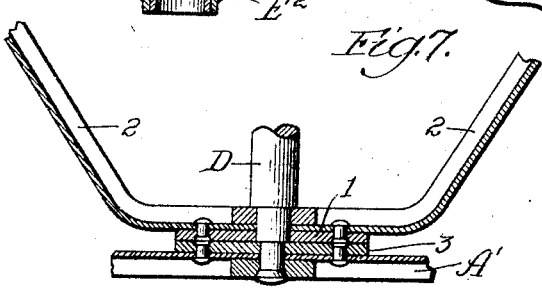
Inventor:
Walter R. Kohler,
By Dyrenforth, Lee, Chritton & Wiles,
Attys.

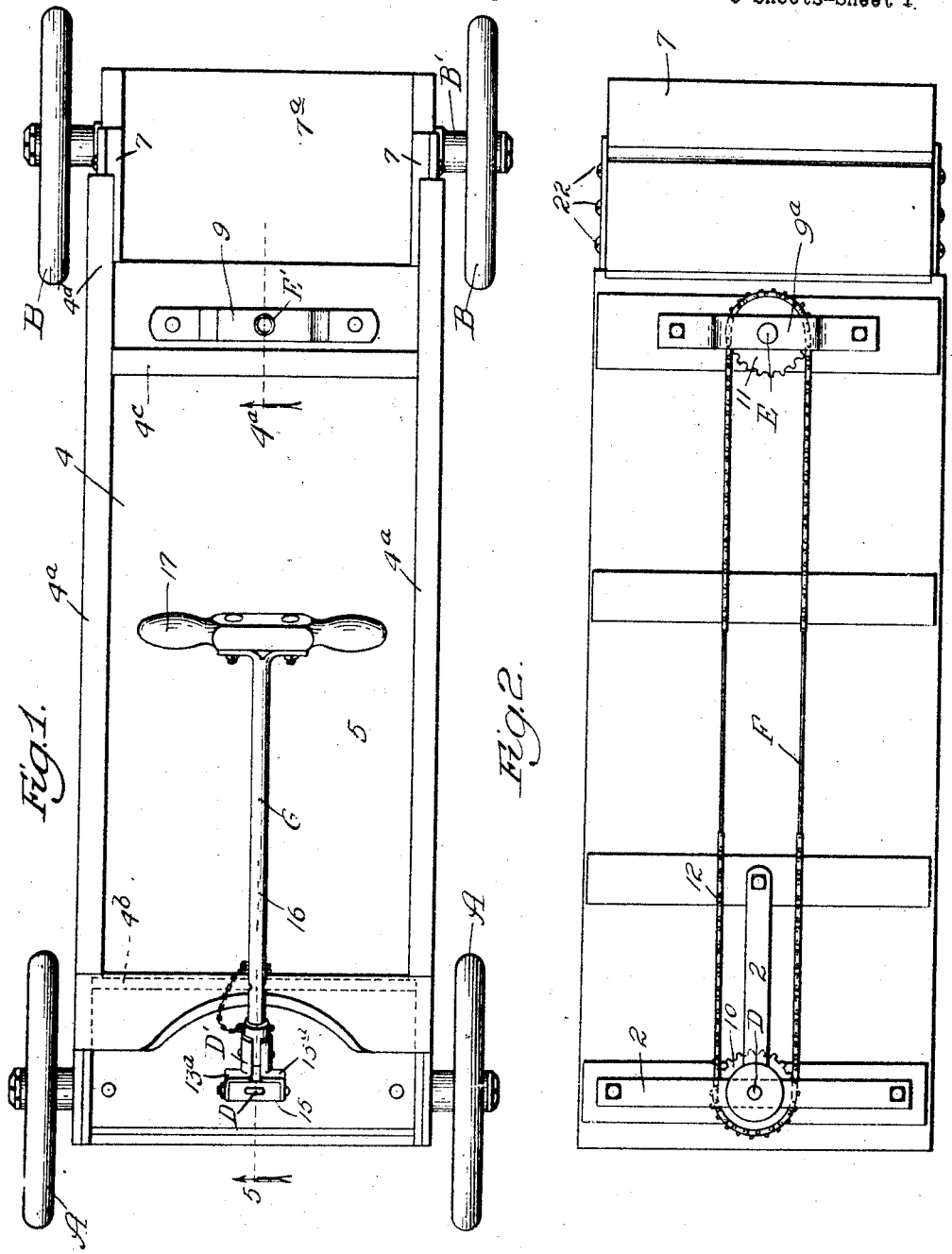

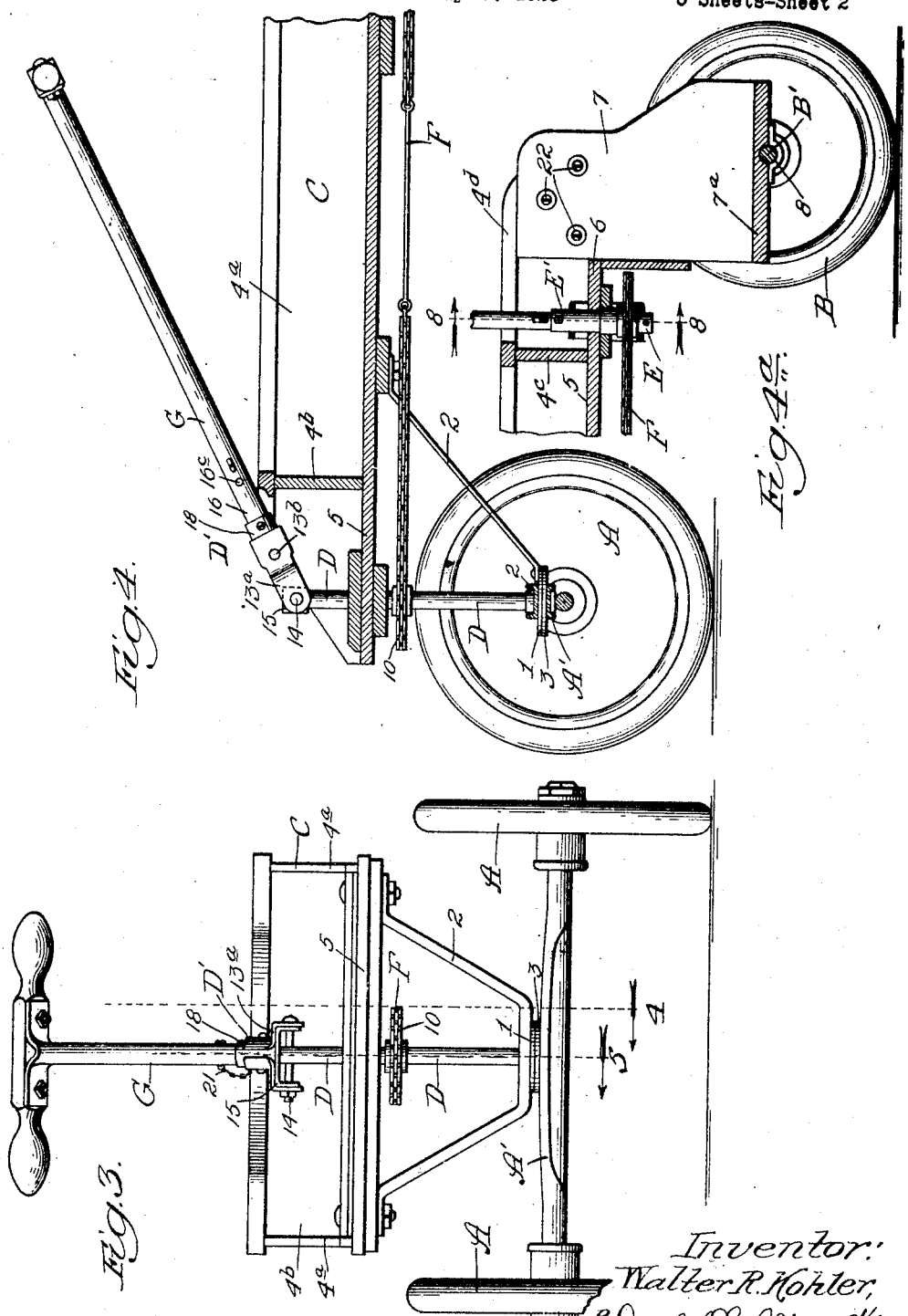

Patented Aug. 2, 1927.

1,637,614

UNITED STATES PATENT OFFICE.

WALTER R. KOHLER, OF JANESVILLE, WISCONSIN, ASSIGNOR TO JANESVILLE PRODUCTS COMPANY, OF JANESVILLE, WISCONSIN, A CORPORATION OF WISCONSIN.

COASTER WAGON.

Application filed May 29, 1926. Serial No. 112,552.

This invention relates particularly to wagons of the type ordinarily employed by children, and known as coaster wagons.

The primary object of the invention is to provide an improved wagon of this type equipped with improved steering means. The invention is illustrated in its preferred embodiment in the accompanying drawings, in which—

Fig. 1 represents a plan view of a coaster wagon constructed in accordance with the invention; Fig. 2, a bottom view of the body of the wagon, illustrating the manner in which the front and rear steering devices are geared together; Fig. 3, a front end elevational view of the improved wagon; Fig. 4, a broken vertical longitudinal sectional view of the front portion of the wagon; Fig. 4$^a$, a similar sectional view of the rear portion of the wagon on a reduced scale, the section being taken as indicated at line 4$^a$ of Fig. 1; Fig. 5, a broken vertical sectional view on an enlarged scale, the section being taken as indicated at 5 of Fig. 1; Fig. 6, a broken detail view illustrating the manner in which the steering handle is connected with the front steering post; Fig. 7, a broken vertical sectional view taken as indicated at line 7 of Fig. 5; and Fig. 8, a broken vertical sectional view taken as indicated at line 8 of Fig. 4$^a$, this view showing the steering handle applied to the rear steering post of the steering mechanism.

In the embodiment illustrated, A designates a pair of front wheels mounted on a front axle A'; B, a pair of rear wheels mounted on a rear axle B'; C, a body mounted on said axles; D, a front steering post having its lower end fixedly secured to the front axle and having its upper end equipped with a pivotally mounted socket-member D'; E, a rear steering post journalled in the rear portion of the body C and equipped at its upper portion with a socket-member E'; F, gear mechanism connecting the steering posts D and E so that they will turn in unison; and G, a steering handle which is interchangeably mounted, that is, adapted for connection either with the pivoted socket-member D' of the front steering post or with the rigid socket-member E' of the rear steering post.

In the illustration given, the front portion of the body C is equipped with a turn-plate 1 carried by depending braces 2 which are rigidly secured at their upper ends with the body C. As shown in Fig. 7, the turn-plate 1 rests upon a turn-plate 3 with which the front axle A' is equipped. The steering post D extends freely through the plate 1 and is rigidly secured to the axle A' so that the axle must turn with the steering post.

The wagon-body C preferably comprises a rectangular platform, or bottom, 4 equipped with side-members 4$^a$, a front cross-member 4$^b$, and a rear cross-member 4$^c$. The front and rear members 4$^b$ and 4$^c$ are placed some distance from the end of the platform, thus providing a front extension 5 and a rear extension 6 of the platform.

The steering post D has its upper end journalled in the front platform-extension 5; and the rear steering post E is journalled in the rear platform-extension 6.

The braces 2 support the front end of the body C at a distance above the front axle. The rear portion of the body is equipped back of the rear platform-extension 6 with a pair of depending side-members 7 which are rigidly connected at their lower ends with a lower platform-member, or step, 7$^a$. The step 7$^a$ is supported upon the rear axle B and is suitably connected with the axle by fastening clips 8. The side pieces 7 rise a suitable distance above the step 7$^a$ to support the rear end of the wagon-body at about the same height that the front end is supported by the braces 2.

The rear steering post E is additionally journalled in metallic supporting-strips 9 and 9$^a$ secured to the rear platform-extension 6.

The gear mechanism F for connecting the front steering post and rear steering post E so they will turn in unison comprises, in the illustration given, gears 10 and 11 fixedly secured to said steering posts, respectively; and a handle-chain connection 12 connecting said gears. Any other suitable means for causing the steering posts to turn in unison may be employed.

The steering knuckle, or socket-member, D', is shown as comprising a tubular member 13 equipped at its lower end with furcations 13$^a$ which are connected by a pivot bolt 14 with a knuckle-member 15 which is rigidly secured to the upper end of the steering post D.

The steering handle G comprises, in the illustration given, a tubular shaft 16 whose lower end is adapted to be telescopically received within either the socket-member D' at the front end of the wagon, or within the socket-member E' at the rear portion of the wagon; and a cross-bar 17 rigidly secured to the upper end of the shaft 16. The shaft 16 preferably is tubular. It is provided at its lower end with a transverse groove $16^a$. Also, it is provided a short distance above its lower end with a transverse perforation $16^b$; and, at a higher point, it is provided with a parallel transverse perforation $16^c$. The perforation $16^b$ is adapted to register with a perforation 18 with which the tubular portion 13 of the socket-member D' is provided; and the perforation $16^c$ is adapted to register with a perforation 19 with which the upper portion of the rear socket-member E' is provided. A cotter-pin 20, connected by a chain 21 with the shaft of the handle, is adapted to secure the handle bar in either socket, depending upon whether a front or rear drive is desired. The manner in which the interchange can be effected from the front socket-member, as shown in Fig. 6, to the rear socket-member, as shown in Fig. 8, will be understood without further description. It may be added, however, that when the steering handle is applied to the rear socket-member, the shaft extends further into the socket-member than is the case when the steering handle is applied to the front socket-member. By this provision, the steering handle is of suitable length for steering purposes when employed at the front end of the wagon and is also of suitable length for drawing the wagon. On the other hand, when the steering handle is applied to the rear steering post, it is to be understood that it extends vertically and is rigidly upright, while capable of turning the rear steering post, and, thus, through the medium of the gear mechanism F, turning the front steering post so as to effect steering of the wagon.

It may be remarked further that the depressed platform, or step, $7^a$ has no obstruction above it. That is, the step is accessible from the rear and the space above the step is open. Thus, a boy may, if he desires, stand upon the step; or, he may place one foot upon the step and propel the vehicle with the other foot while resting his hand upon the cross-bar of the steering handle, assuming the steering handle to be applied to the rear steering socket.

If desired, the steering may be effected by a boy sitting in the wagon; or, a boy may place one knee in the wagon and propel the wagon from the side while effecting the steering by means of the steering handle applied to the front socket-member D'.

The sides $4^a$ of the wagon-body are shown extended rearwardly, as indicated at $4^d$; and the upper portions of the side-members 7 which rise from the step $7^a$ are shown connected with the extensions $4^d$ by means of screws 22. In effect, the foot-board $7^a$ and side-members 7 are a rigid portion of the wagon-body, corresponding in height with the braces 2 which support the front end of the body.

It will be noted that the shaft G is also provided with notches $16^a$ which engage either the rivet $13^b$ (Fig. 6) on the front socket-member or the rivet $E^2$ (Fig. 8) on the rear socket-member. Thus the stress of steering is taken by these rivets, the cotter-pin 20 serving only to retain the steering shaft in the socket-member.

It will be readily understood by those skilled in the art that the improved wagon is capable of being used in a variety of ways, enabling novel effects to be gained. Moreover, the construction is simple, staunch and durable.

The foregoing detailed description has been given for clearness of understanding only, and no unnecessary limitations should be understood therefrom, but the appended claims should be construed as broadly as permissible in view of the prior art.

What I regard as new, and desire to secure by Letters Patent, is:

1. In a coaster wagon, a body, parallel front and rear steering posts journalled therein and geared together, the front post carrying a pivoted tubular socket-member and the rear post carrying a fixed tubular socket-member, a front axle carrying the front steering post, wheels journalled on said axle, wheels supporting the rear portion of said body, and a steering-handle having a shaft adapted to fit in either of said socket-members and interlock therewith, and means for securing said shaft in either socket-member.

2. In a coaster wagon, front and rear steering posts provided, respectively, with pivoted and fixed socket-members, a steering-handle having a shaft adapted for connection with either socket-member, and connecting devices permitting limited telescoping of said shaft with the front socket-member and greater telescoping of said shaft with the rear socket-member.

3. In a coaster wagon, a body-box having a short platform-extension projecting back of the rear end wall, a front steering post journalled at the front portion of said box and carrying a pivoted socket-member, a rear steering post journalled through said platform-extension and equipped with a socket-member, gear connections between said posts below said box, a front axle secured to the front steering post, a rear axle supporting the rear portion of said box, a step adjacent the rear axle and at a distance below the plane of said platform, and means for turning either steering post.

4. In a coaster wagon, a body having its front portion equipped with depending braces equipped with a turn-plate and having its rear portion equipped with a rigid depending extension carrying a step accessible from the rear, an axle supporting said extension, a front steering-post journalled in the front portion of said body and extending through said turn-plate, a front axle secured to the lower portion of said steering-post, a rear steering-post journalled in said body in front of the plane of said step, gear connections between said steering posts, and means for turning either one of said steering-posts.

5. A coaster wagon comprising a body having its front end equipped with a depending turn-plate and having its rear end equipped with rigid depending side-members connected at their lower ends by a step, a front steering post journalled in the front portion of said body and through said turn-plate, a front axle rigidly connected with the lower end of said steering post, a pivoted socket-member connected with the upper portion of said steering post, a rear steering post journalled in the rear portion of said body in front of the plane of said step and provided with a socket-member, gear connections between said steering posts, and a steering-handle adaptable to either of said socket-members.

WALTER R. KOHLER.